United States Patent [19]

Stuchlik, III

[11] Patent Number: 4,747,506

[45] Date of Patent: May 31, 1988

[54] ADJUSTABLE OUTLET BOX MOUNTING ASSEMBLY

[76] Inventor: Charles F. Stuchlik, III, RD1 - P.O. Box 304B, Milton, Del. 19968

[21] Appl. No.: 11,752

[22] Filed: Feb. 6, 1987

[51] Int. Cl.$^4$ .............................................. H02G 3/08
[52] U.S. Cl. .................................. 220/3.9; 220/3.6; 248/DIG. 6; 248/217.3; 248/218.4; 248/298
[58] Field of Search ................... 220/3.9, 3.3, 3.5, 3.6, 220/3.7, 3.92; 248/205 R, DIG. 6

[56] References Cited

U.S. PATENT DOCUMENTS

| | | | |
|---|---|---|---|
| 2,644,600 | 7/1953 | Senif | 220/3.9 |
| 3,537,698 | 11/1970 | Callanan | 220/3.6 X |
| 3,730,466 | 5/1973 | Swanquist | 220/3.9 X |
| 3,834,658 | 9/1974 | Theodorides | 248/205 R |
| 4,062,470 | 12/1977 | Boteler | 220/3.3 |
| 4,135,337 | 1/1979 | Medlin | 52/221 |
| 4,140,293 | 2/1979 | Hansen | 248/217.2 |
| 4,447,030 | 5/1984 | Nattel | 248/27.1 |
| 4,533,060 | 8/1985 | Medlin | 220/3.9 |
| 4,572,391 | 2/1986 | Medlin | 220/3.9 |
| 4,603,789 | 8/1986 | Medlin, Sr. | 220/3.9 |

Primary Examiner—Steven M. Pollard
Attorney, Agent, or Firm—Parkhurst & Oliff

[57] ABSTRACT

An adjustable outlet box mounting assembly comprising an electrical outlet box slidably engaged with a mounting bracket adapted to be secured to a wall stud. The oultet box mounting assembly comprises an outlet box having an attaching portion provided on one side wall, a U-shaped mounting bracket having an attaching leg with means for slidably engaging the attaching portion of the outlet box, and stopping means for limiting the forward and rearward travel of the outlet box with respect to the mounting bracket. The slidable engagement between the outlet box and the mounting bracket in the outlet box mounting assembly of the invention permits the distance from the front edges of the outlet box to the wall stud carry the mounting bracket to be adjusted to accomodate various wall thicknesses.

10 Claims, 4 Drawing Sheets

ADJUSTABLE OUTLET BOX MOUNTING ASSEMBLY

BACKGROUND OF THE INVENTION

The present invention relates to electrical outlet or junction boxes and more particularly to an improved outlet box mounting assembly which permits the outlet box to be mounted on a wood stud without the use of a hammer and to be moved in or out with respect to a wall surface.

Electrical outlet boxes currently in use have an open face which should lie flush with the outer surface of the wall behind which the outlet box extends. During construction of a building, these boxes are normally nailed or secured to wall support studs and are wired before the dry wall, paneling or the like applied to the support studs. Generally, once these outlet boxes have been secured to a support stud, their position with respect to the wall surface cannot be adjusted after the dry wall has been applied. Therefore, in the past, if the outlet boxes were not initially installed in the proper position, it was necessary to expend a great deal of time and effort in order to ensure that the outlet box was flush with the wall surface as required by the National Electrical Code.

Some devices for adjustably mounting an outlet box to a support stud have been suggested. However, these prior devices suffer from a number of disadvantages. For example, one type of known adjustable mounting assembly does permit easy access to the adjusting means after the wiring had been installed in the outlet box. This is a significant disadvantage, since the wiring normally is installed in the outlet box before the dry wall is applied. Other prior adjustable devices have proven complicated to install or manufacture.

It is, therefore, an object of the present invention to provide an adjustable outlet box with mounting assembly which does not suffer from the disadvantages of prior outlet box assemblies.

It is another object of the present invention to provide an outlet box mounting assembly which permits adjustment of the outlet box with respect to the surface of subsequently applied dry wall or paneling.

Yet another object of the present invention is to provide an adjustable outlet box mounting assembly which is easily adjustable even after wiring of the outlet box.

A still further object of the present invention is to provide an adjustable outlet box mounting assembly which can be installed by pushing it onto a support stud by hand, without the use of a hammer or the like, thereby saving labor.

Still another object of the present invention is to provide an adjustable outlet box mounting assembly which can be easily and inexpensively manufactured.

Still another object of the present invention is to provide an adjustable outlet box mounting assembly which includes means for limiting the extent of travel of the outlet box relative to the support studs.

Other objects and advantages of the present invention will become apparent by reference to the following description and drawings.

SUMMARY OF THE INVENTION

The adjustable outlet box mounting assembly of the present invention includes an outlet box having an open front face and side walls which have front edges which lie in the same plane. An attaching portion is provided on one of the side walls of the outlet box. This attaching portion extends outwardly from the surface of the side wall and has an upwardly extending edge projection and a downwardly extending edge projection. A mounting bracket is slidably mounted on the attaching portion of the outlet box. The mounting bracket is U-shaped and comprises an attaching leg, a front leg and a clamping leg. The attaching leg of the mounting bracket has upper and lower longitudinal slots adapted to receive the edge projections of the attaching portion, thereby providing sliding engagement between the outlet box and the mounting bracket. The front leg of the mounting bracket extends substantially perpendicular to the side wall of the outlet box and is parallel to the plane containing the front edges of the side walls of the outlet box.

The outlet box mounting assembly of the present invention further comprises first stopping means for limiting the forward travel of the outlet box relative to the mounting bracket, second stopping means for limiting the rearward travel of the outlet box relative to the mounting bracket and means for fixedly securing the mounting bracket to a support stud in a building structure.

DETAILED DESCRIPTION OF THE INVENTION

Figure 1:
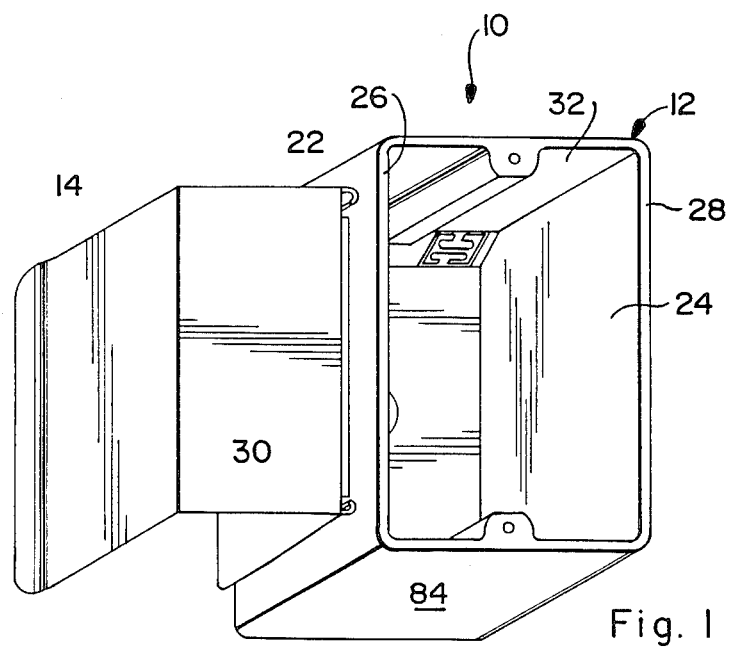
FIG. 1 is a perspective view of the outlet box mounting assembly of the present invention.

Referring now to FIG. 1, there is shown an outlet box mounting assembly 10 of the present invention. This outlet box mounting assembly 10 comprises two major structural components, outlet box 12 and a mounting bracket 14. In accordance with the principles of the present invention, the mounting bracket 14 slidably engages a portion of the outlet box 12 thereby permitting movement of the outlet box 12 with respect to the mounting bracket 14. The outlet box 12 is shown in greater detail in FIG. 2. The structure of the mounting bracket 14 is illustrated in FIG. 3.

The outlet box 12 is generally similar in size and shape to standard, known eletrical outlet boxes. Of course, the outlet box 12 is not limited to a single gang box. The outlet box 12 has a rear wall 20, side walls 22, 24 and an open front face opposite the rear wall 20. The front edges 26, 28 of the side walls 22, 24 lie in the same plane. An attaching portion 30 is provided on one of the side walls 22. Attaching portion 30 provides means for slidably mounting the mounting bracket 14 on the outlet box 12. Of course, the attaching portion 30 could be provided on the other side wall 24 or on the rear wall 20, top wall 32 or bottom wall 34 in response to specific mounting requirements.

Figure 4:
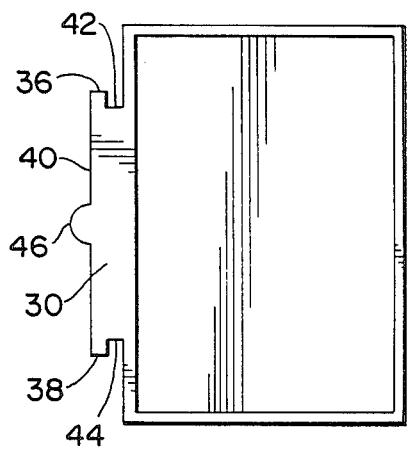
FIG. 4 is a cross-sectional view taken along line 4—4 of FIG. 2.

The attaching portion 30 of the outlet box 12 extends outwardly from the side wall 22 and has two projections 36, 38 provided along opposite edges thereof. In the embodiment shown in FIG. 2, attaching portion 30 terminates in a substantially flat end face 40. Edge projection 36 is an upward extension of end face 40 and edge projection 38 is a downward extension of end face 40. An upper passage 42 is formed between the upward edge projection 36 and the side wall 22. A corresponding lower passage 44 is formed between the downward edge projection 38 and the side wall 22. In a preferred embodiment of this invention, a boss 46 is provided on the surface of the end face 40 of the attaching portion 30. As will be explained more fully hereinafter, the boss 46 cooperates with a portion of the mounting bracket 14 to limit travel of the outlet box 12 relative to the mounting bracket 14. The upper passage 42, lower passage 44 and boss 46 are shown in the cross-sectional view of the outlet box 12 in FIG. 4.

The mounting bracket 14 is shown in engagement with the outlet box 12 in FIG. 1. Referring now to FIG. 3, there is shown the mounting bracket 14 disassembled from the outlet box 12. The mounting bracket 14 is substantially U-shaped with a front leg 50 and two legs, an attaching leg 52 and a clamping leg 54, extending from opposite ends thereof. When the outlet box mounting assembly 10 is in use, a support stud or the like is received between attaching leg 52 and clamping leg 54 and is held against front leg 50.

Preferably, the mounting bracket 14 has barbs or locking spurs 56 provided on the attaching leg 52 and the clamping leg 54. When the mounting bracket 14 is positioned on the support stud, the locking spurs 56 penetrate into the support stud thereby locking the mounting bracket 14 in position. The locking spurs 56 prevent movement of the mounting bracket 14 after it has been secured to the support stud.

Locking spurs 56 are stamped in from the side of the mounting bracket 14 as shown in FIG. 3. When the mounting bracket 14 is pushed onto the support stud the locking spurs 56 slide over the wood and then dig into the wood when the mounting bracket 14 is in place. The clamping capability of the clamping leg 54 plus the locking spurs 56 hold the outlet box mounting assembly 10 in place on the support stud. Although the mounting bracket shown in FIG. 3 has three locking spurs 56 provided on each of the attaching leg 52 and the clamping leg 54, any number of locking spurs 56 could be used provided they were sufficient to secure the mounting bracket 14 to the support stud. It is to be understood that other means for fixing the mounting bracket to the wall stud could be provided if necessary. For example, nail holes could be provided through the front leg 50 and/or the clamping leg 54 so that nails could be driven through the nail holes to secure the mounting bracket 14 to a sub-sized support stud.

When the mounting bracket 14 is engaged with the outlet box 12 as shown in FIG. 1, the outlet leg 52 is positioned adjacent to the outlet box and the front leg 50 extends substantially perpendicular to the side wall 22. The front end of the attaching leg 52 is adjacent to one end of the front leg 50 and the front end of the clamping leg 54 is adjacent to the other end of the front leg 50. Thus, when the mounting bracket 14 is in position on the outlet box 12, the attaching leg 52 and the clamping leg 54 extend rearwardly from the front leg 50. The surface of the front leg 50 lies in a plane which is substantially perpendicular to the side wall 22 and parallel to the plane containing the front edges 26, 28 of the side walls 22, 24.

The attaching leg 52 has upper and lower longitudinal slots 58, 60 provided along the outer surface thereof. In the embodiment shown in FIG. 3, these longitudinal slots 58, 60 are formed by the outwardly curled upper and lower longitudinal edges 62, 64 of the attaching leg 52. When the mounting bracket 14 is assembled with the outlet box 12 as shown in FIG. 1, the edge projections 36, 38 of the attaching portion 30 are slidably received in the longitudinal slots 58, 60 of the attaching leg 52. Sliding engagement between the outlet box 12 and the mounting bracket 14 of the outlet box mounting assembly 10 is thereby achieved.

The clamping leg 54 of the mounting bracket 14 is preferably inwardly biased to enhance the clamping of the mounting bracket 14 onto a support stud. The spring or biasing effect of the clamping leg 54 urges the clamping leg 54 toward the attaching leg 52 thereby providing a secure grip on a support stud therebetween. In a preferred embodiment of the mounting bracket 14, the clamping leg 54 is longer than the attaching leg 52 and has an outwardly curved end portion 66 as shown in FIG. 3. The end of the clamping leg 54 is curved outward to facilitate positioning the mounting bracket 14 on the support stud.

Figure 6:
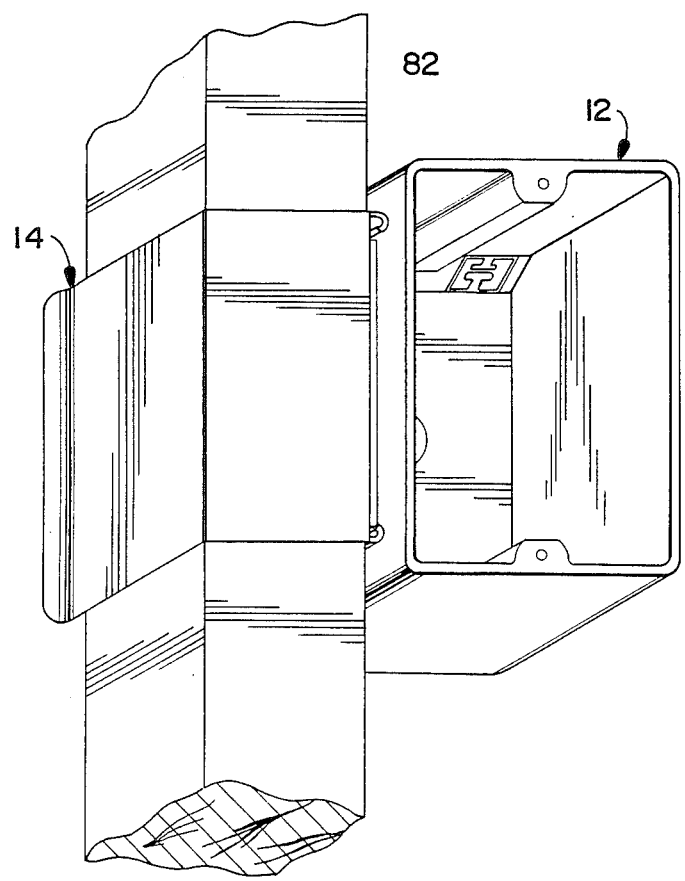
FIG. 6 is a perspective view of the outlet box mounting assembly positioned on a support stud in a wall structure.
Figure 7:
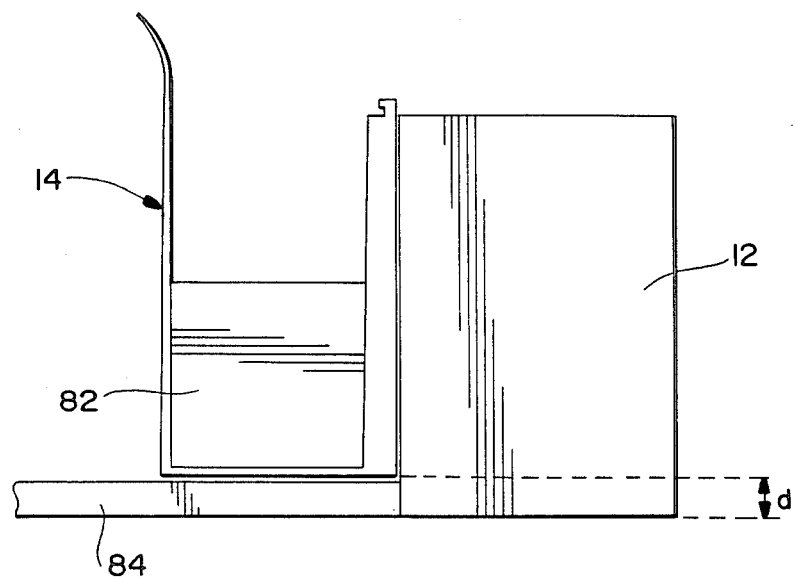
FIG. 7 is a top view of the outlet box mounting assembly in use with thin wallboard.
Figure 8:
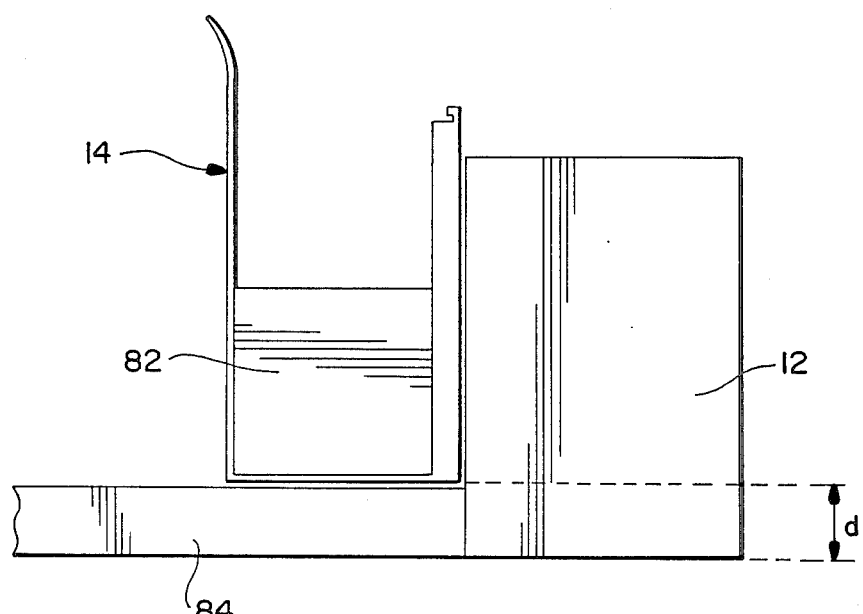
FIG. 8 is a top view of the outlet box mounting assembly in use with thick wallboard.

When the outlet box mounting assembly 10 of the present invention is assembled as shown in FIG. 1, and secured to a support stud in a wall structure as shown in FIG. 6, the outlet box 12 is movable relative to the mounting bracket 14. That is, the mounting bracket 14 is securely fastened to the support stud 82 and the outlet box 12 can slide relative to the mounting bracket 14 such that the distance from the plane containing the front edges 26, 28 of the side walls 22, 24 to the front leg 50 of the mounting bracket 14 varies. Since the distance from the plane containing the front edges 26, 28 of the sidewalls 22, 24 to the front leg 50 can be changed, the outlet box mounting assembly 10 of the present invention can be adjusted after the mounting bracket 14 is secured to the wall stud 82 in order to accommodate varying thicknesses of dry wall 84. FIGS. 7 and 8 illustrate the outlet box mounting assembly 10 of the present invention as positioned to accommodate two different thicknesses of dry wall or paneling.

In the adjustable outlet box mounting assembly 10 of the present invention, there are provided stopping means for limiting the travel of the outlet box 12 with respect to the mounting bracket 14. As can be readily appreciated, it is necessary to provide means for retaining the outlet box 12 in sliding engaging with the mounting bracket 14 after the mounting bracket 14 has been secured to wall stud 82. Similarly, it is desirable to limit the distance between the front of the outlet box 12 and the front leg 50 of the mounting bracket 14 in order to ensure adequate support for the outlet box 12 within the wall structure. The stopping means also prevent the outlet box 12 from being pulled through the dry wall or paneling when removing an electrical cord which may have been plugged into the receptacle.

In order to limit the travel of the outlet box 12 relative to the mounting bracket 14, first and second stopping means are provided in the outlet box mounting assembly 10 of the present invention. In this context, forward travel of the outlet box 12 shall be defined as travel in the direction toward the dry wall 84, that is, travel in the direction which increases the distance between the front of the outlet box 12 and the front leg 50 of the mounting bracket 14. Similarly, rearward travel shall be defined as travel by the outlet box 12 in a direction away from the dry wall 84, that is, travel in the direction which decreases the distance between the front of the outlet box 12 and the front leg 50 of the mounting bracket 14.

Figure 2:
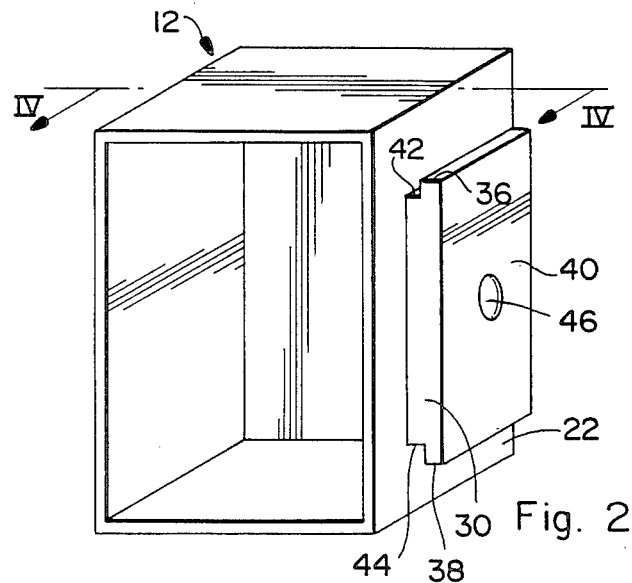
FIG. 2 is a perspective view of the outlet box disassembled from the mounting structure.
Figure 3:
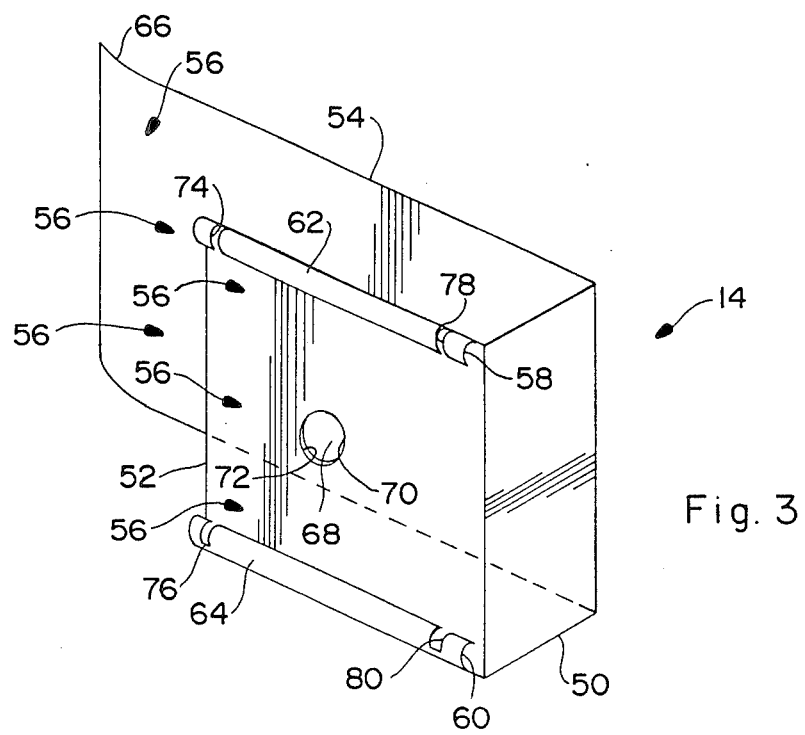
FIG. 3 is a perspective view of the mounting bracket disassembled from the outlet box.

One preferred stopping means for limiting forward travel of the outlet box 12 can be seen in FIGS. 2 and 3. This stopping means for limiting forward travel comprises the boss 46 on the attaching portion 30 of the outlet box 12 and the aperture 68 provided in the attaching leg 52 of the mounting bracket 14. When the outlet box 12 and the mounting bracket 14 are assembled as shown in FIG. 1, the outlet box 12 will be permitted to move in the forward direction until the boss 46 encounters the aperture 68. When the boss 46 encounters the aperture 68, the boss 46 extends into the aperture 68 and contacts the forward edge of the aperture 68 thereby preventing further forward travel of the outlet box 12. It will be readily appreciated that the boss 46 and the aperture 68 may be of any suitable size and shape. In addition, a structure in which the boss 46 always extended into the aperture 68 would also be possible. In such an arrangement, forward travel of the outlet box 12 would be limited by contact of the boss 46 with the front edge 70 of the aperture 68. Rearward travel of the outlet box 12 could be limited by contact of the boss 46 with the rear edge 72 of the aperture 68.

Figure 5:
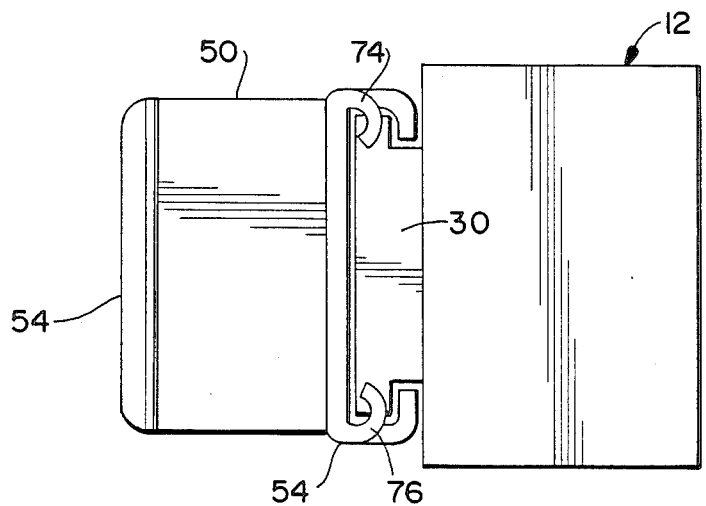
FIG. 5 is a rear view of the outlet box mounting assembly of FIG. 1.

In a preferred embodiment of an outlet box mounting assembly 10 of the present invention, stopping means for limiting rearward travel of the outlet box 12 are provided on the attaching leg 52 of the mounting bracket 14. As can be seen in FIG. 3, and in the enlarged detail shown in FIG. 5, a preferred form of stopping means for limiting the rearward travel of the outlet box 12, comprises end crimps 74, 76 provided at the rear of the upper and lower longitudinal edges 62, 64 of the attaching leg 52. The end crimps 74, 76 effectively block the travel of the edge projections 36, 38 of the attaching portion 30 through the longitudinal slots 58, 60 of the attaching leg 52. Of course, end crimps 74, 76 are only one example of means for effectively blocking the longitudinal slots 58, 60. Any means of effectively blocking the ends of the longitudinal slots 58, 60 could effectively limit rearward travel of the outlet box 12 relative to the mounting bracket 14. In addition, similar end crimps 78, 80 could be provided at the front ends of the longitudinal slots 58, 60 to limit travel of the outlet box 12 relative to the mounting bracket 14 in the forward direction.

In a most preferred embodiment of the present invention, the stopping means for limiting forward travel of the outlet box 12 and the stopping means for limiting rearward travel of the outlet box 12 will be provided such that the distance d from the plane containing the front edges 26, 28 of the side walls 22, 24 to the front leg 50 of the mounting bracket 14 cannot exceed ½ inch and cannot be less than ⅛ inch.

In practicing the present invention, the outlet box 12 can be made of any material previously found suitable for producing electrical outlet boxes. Thermoplastic resins, such as polyvinylchloride, have been found to be particularly suitable for the outlet box 12. The attaching portion 30 may be provided on the outlet box 12 by any suitable means. However, it is preferable that the outlet box 12 together with the attaching portion 30 and the boss 46 be injection molded as a single unit. The mounting bracket 14 is preferably made of a resilient metal such as spring steel.

Although the present invention has been described in considerable detail with reference to a specific embodiment thereof, it is to be understood that modifications can be made without departing from the spirit and scope of the present invention as described above and as claimed below.

What is claimed is:

1. An adjustable outlet box mounting assembly comprising:
   an outlet box having an open front face, said outlet box having an attaching portion provided on an outer surface of one side wall;
   a substantially U-shaped mounting bracket having an attaching leg adjacent the outlet box, said attaching leg being slidably engaged with the attaching portion of the outlet box, said outlet box being adjustably movable forwardly and rearwardly with respect to said mounting bracket between two extreme end positions from any one end position to the other end position so that said box can be adjustably positioned with respect to said bracket in any one of a plurality of box mounting positions; and
   stopping means for limiting forward and rearward travel of the outlet box relative to the mounting bracket.

2. The adjustable outlet box mounting assembly of claim 1 further comprising means for fixedly securing the mounting bracket to a support stud.

3. The adjustable outlet box mounting assembly of claim 2 wherein the fixing means comprises locking spurs provided on the mounting bracket.

4. The adjustable outlet box mounting assembly of claim 1 wherein the attaching leg of the mounting bracket has upper and lower longitudinal slots.

5. The adjustable outlet box mounting assembly of claim 4 wherein the attaching portion of the outlet box has an upwardly extending edge projection and a downwardly extending edge projection, said upwardly extending edge projection being positioned within the upper longtiudinal slot of the attaching leg and said downwardly extending edge projection being positioned within the lower longitudinal slot of the attaching leg.

6. The adjustable outlet box mounting assembly of claim 4, wherein the upper longitudinal slot is formed by an outwardly curled upper longitudinal edge of the attaching leg and wherein the lower longitudinal slot is formed by an outwardly curled lower longitudinal edge of the attaching leg.

7. The adjustable outlet box mounting assembly of claim 6, wherein ends of the outwardly curled upper and lower longitudinal edges of the attaching leg are crimped to form the stopping means for limiting travel of the outlet box relative to the mounting bracket.

8. The adjustable outlet box mounting assembly of claim 4, wherein the attaching portion has a boss provided on the surface thereof and the attaching leg has a boss-receiving aperture extending therethrough, said boss and boss-receiving aperture comprising the stopping means for limiting travel of the outlet box relative to the mounting bracket.

9. An adjustable outlet box mounting assembly comprising:
- an outlet box having an open front face, side walls with front edges which lie in a common plane, and an attaching portion provided on one side wall, said attaching portion extending outwardly from the surface of the side wall and having an upwardly extending edge projection and a downwardly extending edge projection;
- A substantially U-shaped mounting bracket slidably mounted on the attaching portion of the outlet box, said mounting bracket comprising an attaching leg with upper and lower longitudinal slots, said attaching leg being adjacent the attaching portion of the outlet box such that the edge projections of the attaching portion are positioned within the upper and lower longitudinal slots; a front leg having one end adjacent the front end of the attaching leg, said front leg extending substantially perpendicular to the side wall and parallel to the plane containing the front edges of the side walls; and a clamping leg extending rearwardly from the outer end of the front leg;
- first stopping means for limiting forward travel of the outlet box relative to the mounting bracket;
- second stopping means for limiting rearward travel of the outlet box relative to the mounting bracket;
- means for fixedly securing the mounting bracket to a support stud; and
- said outlet box being adjustably movable forwardly and rearwardly with respect to said mounting bracket between said first and second stopping means so that said box can be adjustably positioned with respect to said bracket in any one of a plurality of box mounting positions.

10. An adjustable outlet box mounting assembly comprising:
- an outlet box having an open front face, and side walls with front edges which lie in the same plane, said outlet box having an attaching portion provided on one side wall, said attaching portion being provided with an upwardly extending edge projection and a downwardly extending edge projection;
- a substantially U-shaped mounting bracket slidably mounted on the outlet box, said mounting bracket comprising an attaching leg adjacent the outlet box, a front leg having one end adjacent the front end of the attaching leg and extending substantially perpendicular to the side wall parallel to the plane containing the front edges of the side walls, and a clamping leg extending rearwardly from the other end of the front leg, said attaching leg having upper and lower longitudinal slots formed by outwardly curled upper and lower longitudinal edges of the attaching leg, said attaching leg slidably engaging the attaching portion of the outlet box such that the edge projections of the attaching portion are positioned within the upper and lower longitudinal slots of the attaching leg;
- first stopping means for limiting forward travel of the outlet box relative to the mounting bracket, said first stopping means comprising a boss carried by the attaching portion of the outlet box and a boss-receiving aperture formed in the attaching leg of the mounting bracket;
- second stopping means for limiting rearward travel of the outlet box relative to the mounting bracket, said second stopping means comprising crimped rear ends of the upper and lower longitudinal edges of the attaching leg;
- means provided on the mounting bracket for fixedly securing the mounting bracket to a support stud; and
- said outlet box being adjustably movable forwardly and rearwardly with respect to said mounting bracket between said first and second stopping means so that said box can be adjustably positioned with respect to said bracket in any one of a plurality of box mounting positions.

* * * * *

UNITED STATES PATENT AND TRADEMARK OFFICE
CERTIFICATE OF CORRECTION

PATENT NO. : 4,747,506

DATED : May 31, 1988

INVENTOR(S) : C. STUCHLIK III

It is certified that error appears in the above-identified patent and that said Letters Patent is hereby corrected as shown below:

FIGURE 3, should appear as shown on the attached sheet.

Signed and Sealed this

Twenty-fifth Day of October, 1988

Attest:

DONALD J. QUIGG

*Attesting Officer*    *Commissioner of Patents and Trademarks*

UNITED STATES PATENT AND TRADEMARK OFFICE
CERTIFICATE OF CORRECTION

PATENT NO. : 4,747,506

DATED : May 31, 1988

INVENTOR(S) : C. STUCHLIK III

It is certified that error appears in the above-identified patent and that said Letters Patent is hereby corrected as shown below:

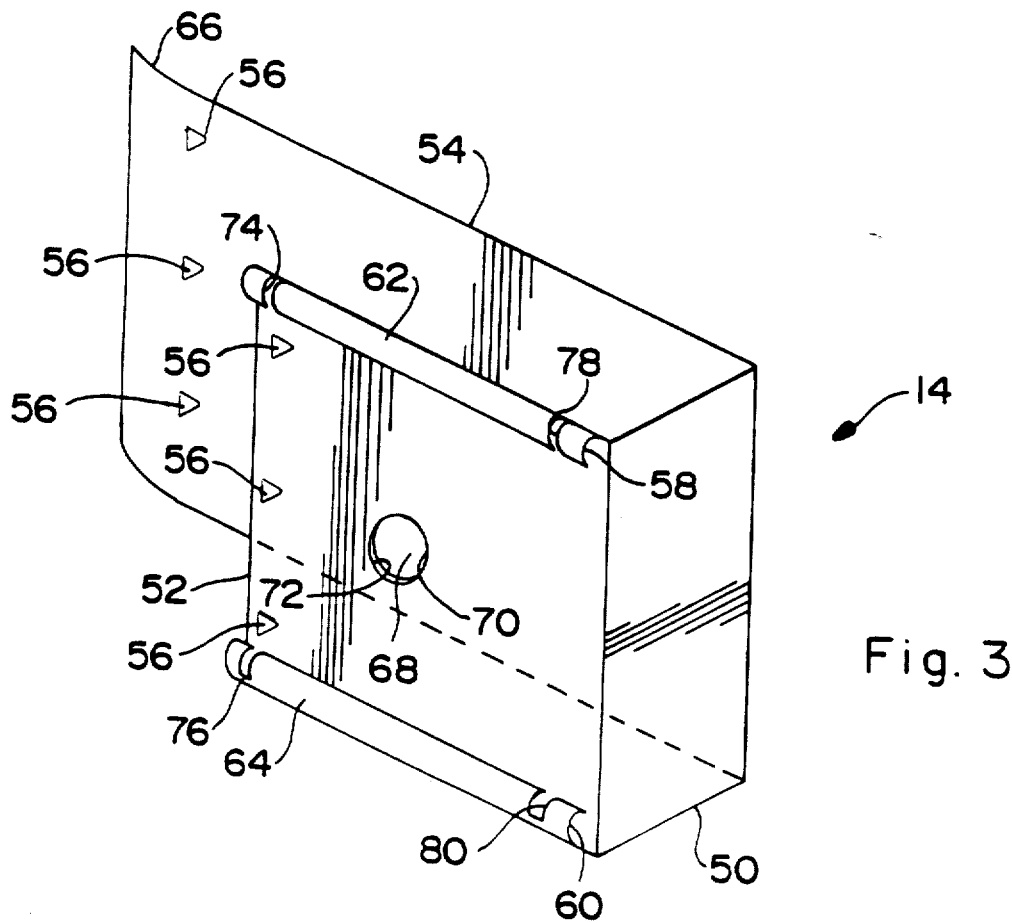

Fig. 3